(12) United States Patent
Kang

(10) Patent No.: US 6,304,603 B1
(45) Date of Patent: Oct. 16, 2001

(54) BLOCK MATCHING METHOD USING A MOVING TARGET WINDOW

(75) Inventor: Sang-ug Kang, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/060,266

(22) Filed: Apr. 15, 1998

(30) Foreign Application Priority Data

Apr. 15, 1997 (KR) ................................. 97-13874

(51) Int. Cl.[7] ....................................... H04N 7/18
(52) U.S. Cl. ................................. 375/240.16; 375/240.17
(58) Field of Search ...................... 382/236; 375/240.16, 375/240.17; 348/699, 700, 416, 415, 413, 409

(56) References Cited

U.S. PATENT DOCUMENTS

| | | | |
|---|---|---|---|
| 5,585,862 | * 12/1996 | Wuertele et al. | 348/699 |
| 5,661,524 | 8/1997 | Murdock et al. | 348/416 |
| 5,796,434 | * 8/1998 | Lempel | 348/416 |
| 5,818,969 | * 8/1998 | Astle | 348/699 |
| 5,990,962 | * 11/1999 | Ueno et al. | 348/416 |

FOREIGN PATENT DOCUMENTS

| | | | |
|---|---|---|---|
| 2-20988 | 1/1990 | (JP) | H04N/7/137 |
| 4-323780 | 11/1992 | (JP) | G06F/15/70 |

* cited by examiner

Primary Examiner—Andy Rao
(74) Attorney, Agent, or Firm—Sughrue, Mion, Zinn, Macpeak & Seas, PLLC

(57) ABSTRACT

A block matching method using a moving target window is provided. The method includes the steps of (a) selecting a reference block Bm from a current frame Fn, by dividing the current frame Fn into blocks of a predetermined size, (b) determining the center point of a target window Wm for estimating a motion, obtained by dividing a previous frame $F_{n-1}$ by a predetermined size, to be the center point $(X_n, Y_n)$ of the reference block Bm, (c) obtaining a motion vector (Dxn, Dyn) with respect to the reference block Bm, using the target window, (d) selecting the next reference block $B_{m+1}$ following the reference block Bm, the center point coordinates of which are $(X_{n+1}, Yn)$ in the current frame Fn, (e) determining whether the current frame Fn has a complicated motion, (f) obtaining a motion vector value using a predetermined general block matching method, when the current frame Fn has a complicated motion, (g) determining the center of a target window $WW_{m+1}$ for estimating the motion, corresponding to the $B_{m+1}$ in the previous frame $F_{n-1}$, to be $(X_{n+1}+Dxn, Yn+Dyn)$, when the current frame Fn does not have a complicated motion, (h) determining whether the target window $WW_{m+1}$ is within the boundary of the previous frame $F_{n-1}$, (i) obtaining a motion vector (DDxn+1, DDYn), when the target window $WW_{m+1}$ is within the boundary of the previous frame $F_{n-1}$, (j) obtaining a motion vector $(DD_{xn+1}, DDyn)$ after limiting the center of the target window $WW_{m+1}$ to be within the boundary of the previous frame $F_{n-1}$, when the target window $WW_{m+1}$ is not within the boundary of the previous frame $F_{n-1}$, and (k) performing the steps (d) through (i) with respect to all the blocks of the current frame.

2 Claims, 4 Drawing Sheets

BLOCK MATCHING METHOD USING A MOVING TARGET WINDOW

BACKGROUND OF THE INVENTION

1. Field of the Invention

The present invention relates to a moving picture compression system, and more particularly, to a block matching method for estimating a motion vector value by moving a target window.

The present application for a block matching method by moving a target window is based on Korean Application No. 97-13874 which is hereby incorporated by reference for all purposes.

2. Description of the Related Art

Generally, redundancy of a moving picture is removed in order to compress the moving picture. In most moving picture compression systems which are currently used, such as MPEG and H.261, a motion estimation method is used to remove the redundancy. The motion vector shows the position difference between a reference block and a matching block by dividing a current frame into various small reference blocks, comparing each reference block with various search area blocks of a previous frame in a given search area, calculating a difference measure, to which the search area blocks are different to the respective reference blocks, and finding the block having the smallest difference measure (hereinafter referred to as a matching block). Then, the above motion vector and a pixel difference between the reference block and the matching block are transferred.

A blocking matching algorithm (BMA) which is widely used for moving picture compression calculates which block of a next image frame is most related to a block of a predetermined size of the current image frame, on the basis of a mean square error. With the BMA, a variation value close to optimal can be found as the range of the target window becomes wider and more search points are found. However, this needs a huge amount of calculation, which makes coding difficult to perform in real time.

Generally, the background of a moving picture is the portion of a screen in which the most precise motion vector can be estimated. This is because the block is not so complicated, and the BMA is based on the fact that a motion vector value has little difference to its adjacent motion vector values. Namely, the target window does not change. Objects move in the same direction (a background screen usually does not move), and in particular, the image of a picture phone has one object of motion. Such a situation is easily assumed during panning. Better estimation can be performed considering such a correlation between adjacent motion variation values. However, the above BMA method has limitations in estimating the motion vector since the motion vector is obtained without considering the correlation with the adjacent motion vectors.

SUMMARY OF THE INVENTION

It is an object of the present invention to provide a block matching method by which it is possible, by moving a target window, to estimate a better motion vector value using a target window of the same size, i.e., requiring the same amount of calculation, by appropriately moving the target window considering the correlation between adjacent variation values during estimation of the motion vector value of a BMA.

To achieve the above object, there is provided a block matching method of moving the target window, comprising the steps of (a) selecting a reference block Bm from a current frame Fn, by dividing the current frame Fn by a predetermined size, (b) determining the center point of a target window Wm for estimating a motion, obtained by dividing a previous frame $F_{n-1}$ by a predetermined size, to be the center point $(X_n, Y_n)$ of the reference block Bm, (c) obtaining a motion vector (Dxn, Dyn) with respect to the reference block Bm, using the target window, (d) selecting the next reference block $B_{m+1}$ following the reference block Bm, the center point coordinates of which are $(X_{n+1}, Yn)$ in the current frame Fn, (e) determining whether the current frame Fn has a complicated motion, (f) obtaining a motion vector value using a predetermined general block matching method, when the current frame Fn has a complicated motion, (g) determining the center of a target window $WW_{m+1}$ for estimating the motion, corresponding to the $B_{m+1}$ in the previous frame $F_{n-1}$, to be $(X_{n+1}+Dxn, Yn+Dyn)$, when the current frame Fn does not have a complicated motion, (h) determining whether the target window $WW_{m+1}$, is within the boundary of the previous frame $F_{n-1}$, (I) obtaining a motion vector (DDxn+1, DDYn), when the target window $WW_{m+1}$ is within the boundary of the previous frame $F_{n-1}$, (j) obtaining a motion vector $(DD_{xn+1}, DDyn)$ after limiting the center of the target window $WW_{m+1}$ to be within the boundary of the previous frame $F_{n-1}$, when the target window $WW_{m+1}$, is not within the boundary of the previous frame $F_{n-1}$, and (k) performing the steps (d) through (l) with respect to all the blocks of the current frame.

In the step (g), the center point $O_{m+1}(XX, YY)$ of the target window $WW_{m+1}$ in the previous frame $F_{n-1}$ for estimating the motion is determined when the current frame Fn does not have a complicated motion in the step (e), XX, which is the x-coordinate of the center point $O_{m+1}$, is the value obtained by adding $X_n$ to the average values of the motion variation values in the x-axis direction of more than two blocks adjacent to the reference block Bm, and YY, which is the y-coordinate of the center point $O_{m+1}$, is the value obtained by adding the Yn to the average values of the motion variation values in the y-axis direction of more than two blocks adjacent to the reference block Bm.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT(S)

Figure 1:
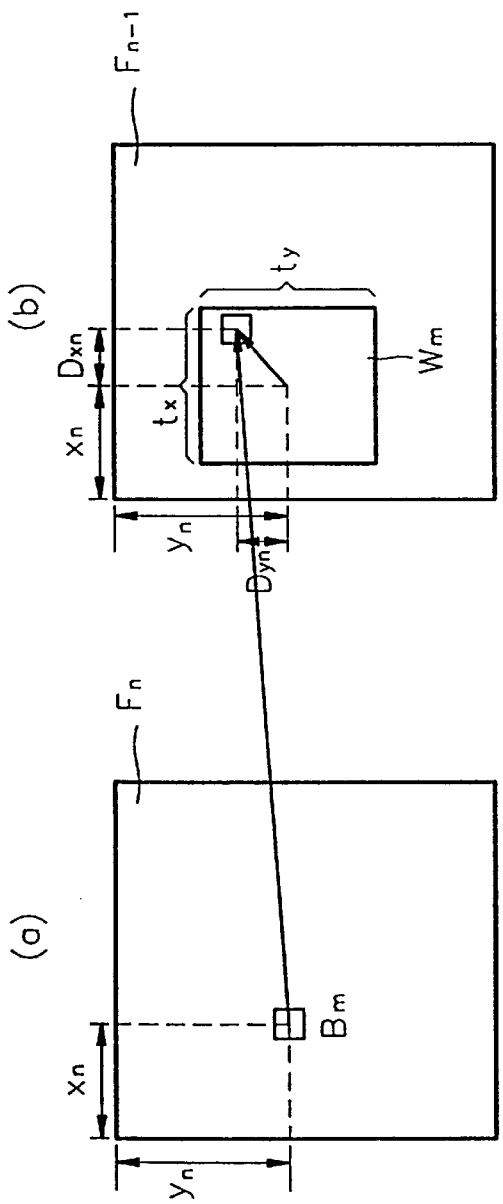
FIGS. 1(*a*) and (*b*) explain a first searching procedure of the present invention.

Hereinafter, the present invention will be described in detail with reference to the attached drawings. In FIGS. 1(*a*)

and (b), a frame Fn follows a previous frame $F_{n-1}$. The Fn determines how much the blocks thereof have moved from their positions in $F_{n-1}$. A block Bm in the frame Fn is selected and a block which is most similar to Bm is found in a target window Wm area. Here, any block matching algorithm (BMA) can be used. A motion vector value, of the block found to be most similar to Bm is assumed to be (Dxn, Dyn).

Figure 2:
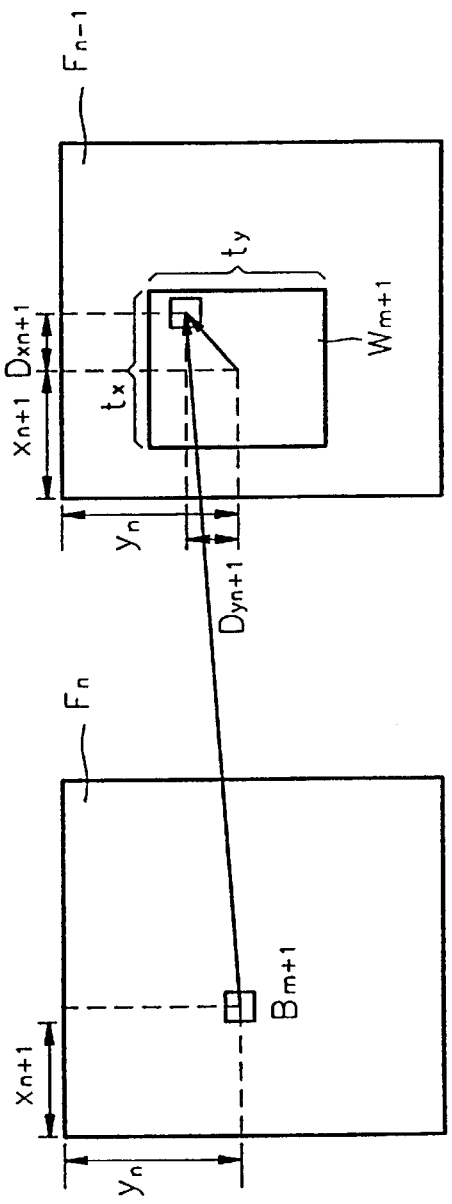
FIGS. 2(*a*) and (*b*) explain a conventional block matching method.

In a conventional method, the above motion vector value (Dxn, Dyn) does not affect the search process for the next block at all. This is described in FIGS. 2(a) and (b). Another motion vector value (Dxn+1, Dyn+1) can be estimated for another block $B_{m+1}$ in the frame Fn and a block similar to $B_{m+1}$ in a target window $W_{m+1}$, area corresponding to the block $B_{m+1}$.

An embodiment of the block matching method of moving the target window, according to the present invention, will be described in detail with reference to FIGS. 3 through 6.

A reference block Bm is selected from the frame Fn as shown in FIG. 1 (step 500). The center point of the target window Wm in the previous frame $F_{n-1}$ is determined to be the center point of the reference block Bm (step 505). The motion vector (Dxn, Dyn) with respect to the above reference block Bm is obtained by a general method (step 510).

Figure 3:
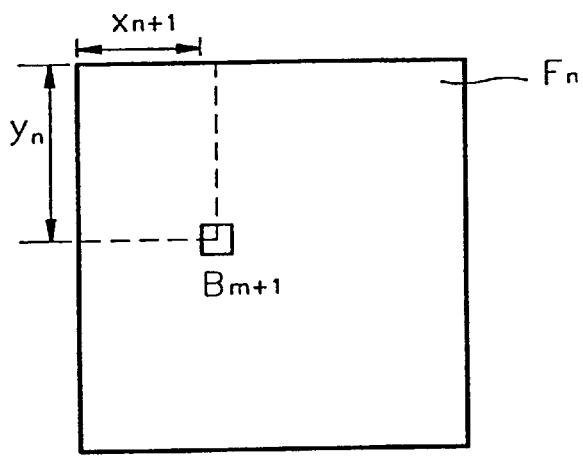
FIGS. 3 and 4 explain a block matching method of moving a target window according to the present invention.

The next reference block $B_{m+i}$, after the reference block Bm, is selected from the frame Fn as shown in FIG. 3 (step 515). Still another motion vector value ($DD_{xn+1}$, $DD_{yn+1}$) can be estimated by finding a block which is most similar to the next reference block $B_{m+1}$ based on a variation value adjacent to the next reference block $B_{m+1}$. This block is found in the target window $WW_{m+1}$ of the frame $F_{n-1}$. The important aspect of this process is the rule of determining the target window $WW_{m+1}$. In the conventional method, the center of the target window was ($X_{n+1}$, Yn) which is the same as the center of the reference block.

In the present invention, it is determined whether the frame Fn has a complicated motion (step 520). If the frame Fn has a complicated motion, motion vectors with respect to all the blocks of the frame Fn are obtained using a general block matching algorithm (step 525).

Figure 7:
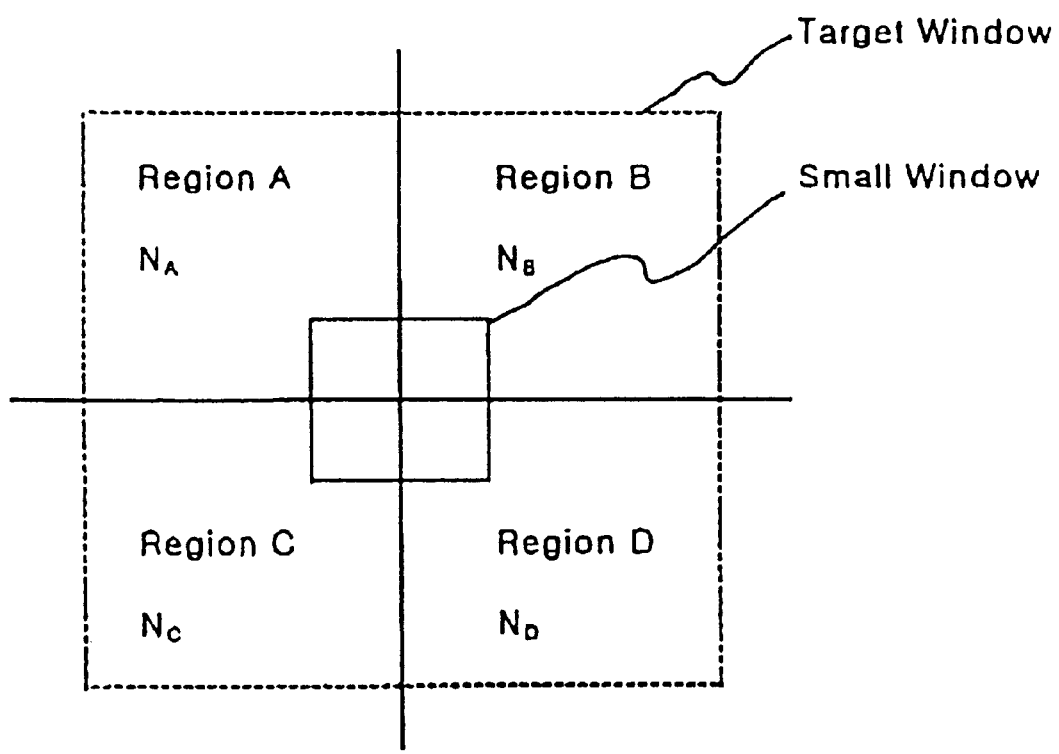
FIG. 7 illustrates the determination of the presence or absence of complicated motion.

It will recognized that the meaning of the term "complicated motion" will be known by those familiar with the art to which this invention pertains. However, an explanation of this term is provided below. As shown in FIG. 7, it is assumed that a target window is divided into four regions (Regions A, B, C and D). Small windows of a predetermined size are set, based on the center point of the target window. The size of the small windows is preset and may vary depending on the situation. Prediction is performed in each block using the motion vector of each block of a previous frame. Deviation between the block obtained by the above prediction and a relevant block of a current frame is obtained. The above deviation (a two dimensional vector) can be mapped to a point, for example, the point (2, 3) in the region B. When the deviation vectors are mapped with respect to every block, the deviation in each block can be mapped to the target window. Points mapped to the small windows are deleted among the mapped points. The number ($N_A$, $N_B$, $N_C$, and $N_D$) of mapped points of each region in the target window is obtained. When the number of the mapped points is not less than a predetermined number (Nth) in at least three regions among the regions, A, B, C, and D, it is determined that a complicated motion exists.

Figure 4:
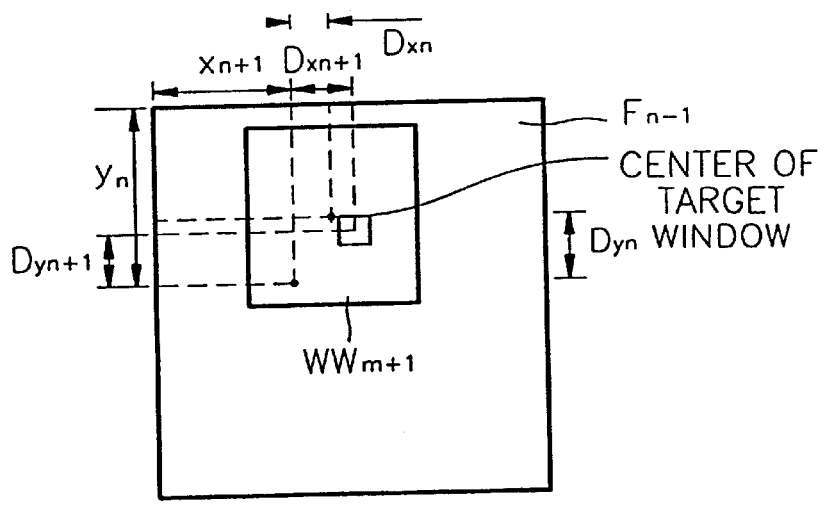

Meanwhile, if the frame Fn is determined not to have a complicated motion, the center of the frame Fn is determined to be ($X_{n+1}$+Dxn, Yn+$D_{yn+1}$) as shown in FIG. 4 and the target window $WW_{m+1}$ area of the same size as previously, is set around the center (step 530). Namely, the probability that corresponding blocks are in the target window is increased, thus the effectiveness of coding is increased by referring to an adjacent motion vector value when the current block is searched for. This is because the motion of an object is much related to an adjacent block, in the image of a picture phone having many portions in which a uniform motion is shown, during panning and compression of a three dimensional image, and in most general moving pictures. After setting the window position, it is checked whether the target window $WW_{m+1}$ is positioned within the boundary of the frame $F_{n-1}$ (step 535). If the target window $WW_{m+1}$ is not within the boundary of the frame $F_{n-1}$, the boundary of the frame is set to be a limitation beyond which the target window cannot be moved. Namely, the movement of the center of the target window $WW_{m+1}$ is limited so that the target window $WW_{m+1}$ is within the frame $F_{n-1}$ (step 540). In this case, the size of the window does not change.

Then, the motion vector value with respect to the $B_{m+1}$ is obtained in the target window $WW_{m+1}$ (step 545). In this way, the motion vector values with respect to all the blocks in the frame Fn are obtained.

Figure 6:
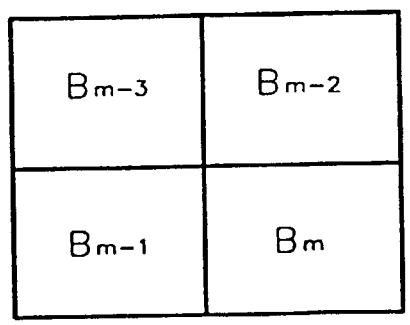
FIG. 6 shows blocks $B_{m-1}, B_{m-2}$, and $B_{m-3}$ adjacent to the previous block (Bm).
Figure 5:
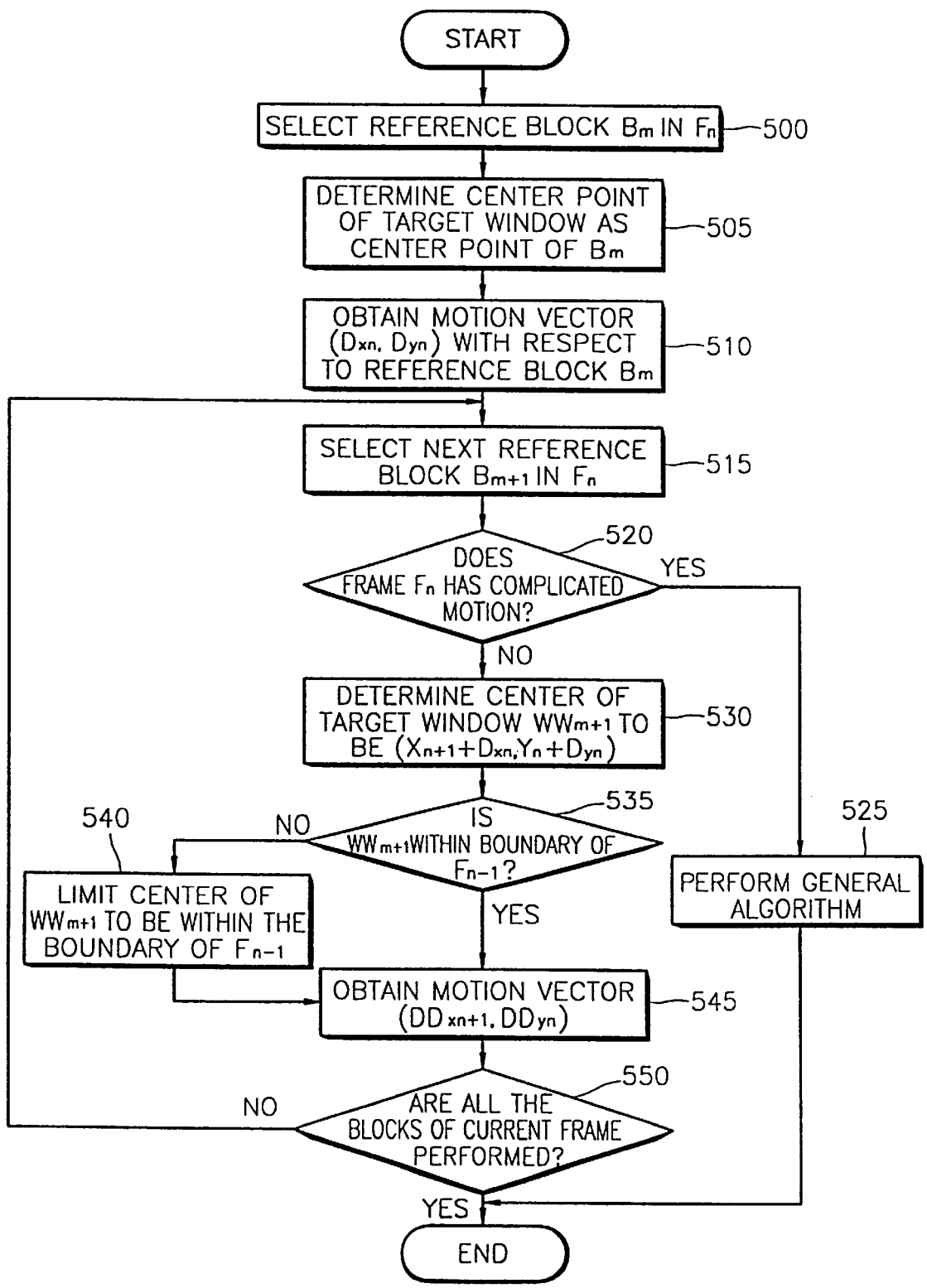
FIG. 5 is a flow chart for describing the operation of an embodiment of the block matching method of moving the target window.

The center position of the target window of the next block was determined with reference to only the variation value ($D_{xn-1}$, $D_{yn-1}$)of the previous block Bm in the step 530 as shown in FIG. 4. However, when there are many adjacent blocks to be referred to, as shown in FIG. 6, it is possible to estimate a more realistic position of the current target window than by using the correlation of only one block variation value. Namely, the center position $O_{m+1}$ of the target corresponding to the block Bm is represented as the following equation.

$O_{m+1}$=(the average of ($D_{xn-1}$,$D_{xn-2}$,$D_{xn-3}$)+Xn, the average of ($D_{yn-1}$,$D_{yn-2}$,$D_{yn-3}$)+yn  Equation (1)

wherein, $D_{xn-1}$, $D_{xn-2}$, and $D_{xn-3}$ are the motion variation values in the x-axis direction, of $B_{m-1}$, $B_{m-2}$, and $B_{m-3}$, respectively, and $D_{yn-1}$, $D_{yn-2}$ and $D_{yn-3}$ are the motion variation values in the y-axis direction, of $B_{m-1}$, $B_{m-2}$, and $B_{m-3}$, respectively.

The number of block variation values to be referred to is varied according to the complexity of movement of a moving object. Generally, the correlation between the adjacent motion vector values is high in an image having a simple motion, and the correlation between the adjacent motion vector values is low in an image having a complicated motion. Also, in the case of an image including an object having very complicated motion, if the above method is not effective, the center position of the target window is set referring only to the center of the current block, as in a conventional method. It is done by setting the average value to be 0 in the equation 1.

If a motion vector is determined as the vector from the center of a target window to the center of a corresponding block, rather than the vector from the center of a block Bm in a frame Fn to the center of a block in a corresponding target window, the vector value becomes less. Therefore, a new variation value is as follows.

vector of ($X_{n+1}$+$D_{xn+1}$,$Y_n$+$D_{yn+1}$)–vector of $O_{m+1}$

With the block matching method according to the present invention, a better moving picture compression performance is obtained. This method is more effective than the conventional BMA method having a target window area of the same size. The motion vector itself has the effect of differential coding, thus it is possible to realize a better compression index in coding the motion vector.

What is claimed is:

1. A block matching method of moving a target window, comprising the steps of:

(a) selecting a reference block Bm from a current frame Fn, by dividing the current frame Fn into first blocks of a predetermined size;

(b) determining the center point of a target window Wm for estimating a motion, obtained by dividing a previous frame $F_{n-1}$ into second blocks of the predetermined size, to be the center point $(X_n, Y_n)$ of the reference block Bm;

(c) obtaining a motion vector (Dxn, Dyn) with respect to the reference block Bm, using the target window;

(d) selecting a next reference block $B_{m+1}$ following the reference block Bm, the center point coordinates of which are $(X_{n+1}, Yn)$ in the current frame Fn;

(e) determining whether or not the current frame Fn has a complicated motion;

(f) obtaining a motion vector value using a predetermined general block matching method, when it is determined in the step (e) that the current frame Fn has a complicated motion;

(g) determining the center of a target window $WW_{m+1}$ for estimating the motion, corresponding to the reference block $B_{m+1}$ in the previous frame $F_{n-1}$, to be $(X_{n+1}+Dxn, Yn+Dyn)$, only when the current frame Fn does not have a complicated motion;

(h) determining whether the target window $WW_{m+1}$ is within the boundary of the previous frame $F_{n-1}$;

(i) obtaining a motion vector $(DD_{xn+1}, DD_{Yn})$, when the target window $WW_{m+1}$ is within the boundary of the previous frame $F_{n-1}$;

(j) obtaining a motion vector $(DD_{xn+1}, DD_{yn})$ after limiting the center of the target window $WW_{m+1}$ to be within the boundary of the previous frame $F_{n-1}$, when the target window $WW_{m+1}$ is not within the boundary of the previous frame $F_{n-1}$; and (k) performing the steps (d) through (i) with respect to all the blocks of the current frame.

2. A block matching method of moving a target window, comprising the steps of:

(a) selecting a reference block Bm from a current frame Fn, by dividing the current frame Fn into first blocks of a predetermined size;

(b) determining the center point of a target window Wm for estimating a motion, obtained by dividing a previous frame $F_{n-1}$ into second blocks of the predetermined size, to be the center point $(X_n, Y_n)$ of the reference block Bm;

(c) obtaining a motion vector (Dxn, Dyn) with respect to the reference block Bm, using the target window;

(d) selecting a next reference block $B_{m+1}$ following the reference block Bm, the center point coordinates of which are $(X_{n+1}, Yn)$ in the current frame Fn;

(e) determining whether the current frame Fn has a complicated motion;

(f) obtaining a motion vector value using a predetermined general block matching method, when the current frame Fn has a complicated motion;

(g) determining a center point $O_{m+1}$ of a target window $WW_{m+1}$ for estimating the motion, corresponding to the reference block $B_{m+1}$ in the previous frame $F_{n-1}$, to be (XX, YY) when the current frame Fn is determined in the step (e) not to have a complicated motion, where XX, which is the x-coordinate of the center point $O_{m+1}$, is the value obtained by adding $X_n$ to the average values of the motion variation values in the x-axis direction of more than two blocks adjacent to the reference block Bm, and YY, which is the y-coordinate of the center point $O_{m+1}$, is the value obtained by adding Yn to the average values of the motion variation values in the y-axis direction of more than two blocks adjacent to the reference block Bm;

(h) determining whether the target window $WW_{m+1}$ is within the boundary of the previous frame $F_{n-1}$;

(i) obtaining a motion vector $(DD_{xn+1}, DD_{Yn})$, when the target window $WW_{m+1}$ is within the boundary of the previous frame $F_{n-1}$;

(j) obtaining a motion vector $(DD_{xn+1}, DD_{yn})$ after limiting the center of the target window $WW_{m+1}$ to be within the boundary of the previous frame $F_{n-1}$, when the target window $WW_{m+1}$ is not within the boundary of the previous frame $F_{n-1}$; and (k) performing the steps (d) through (i) with respect to all the blocks of the current frame.

* * * * *